June 23, 1931.  C. E. TANNEWITZ  1,811,066
SAWING MACHINE
Filed Feb. 23, 1929   2 Sheets-Sheet 1

INVENTOR
Carl E. Tannewitz
BY Chappell & Earl
ATTORNEYS

June 23, 1931. C. E. TANNEWITZ 1,811,066
SAWING MACHINE
Filed Feb. 23, 1929 2 Sheets-Sheet 2
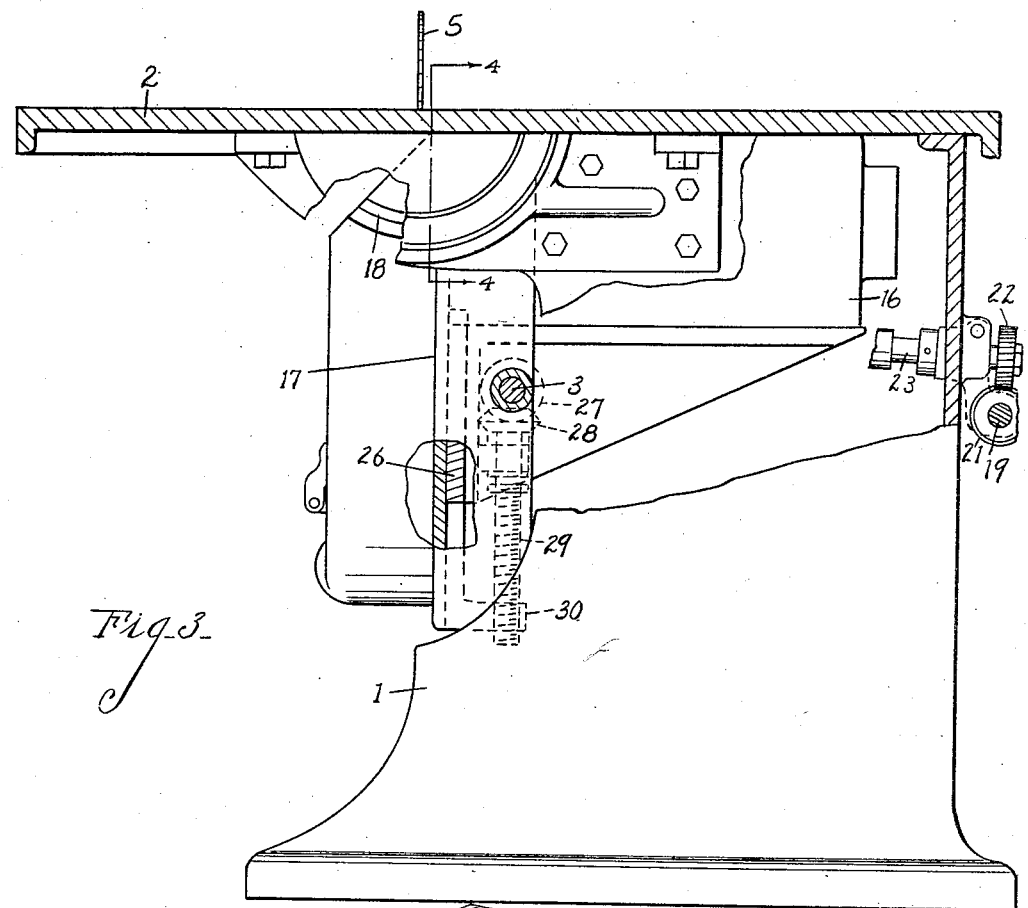
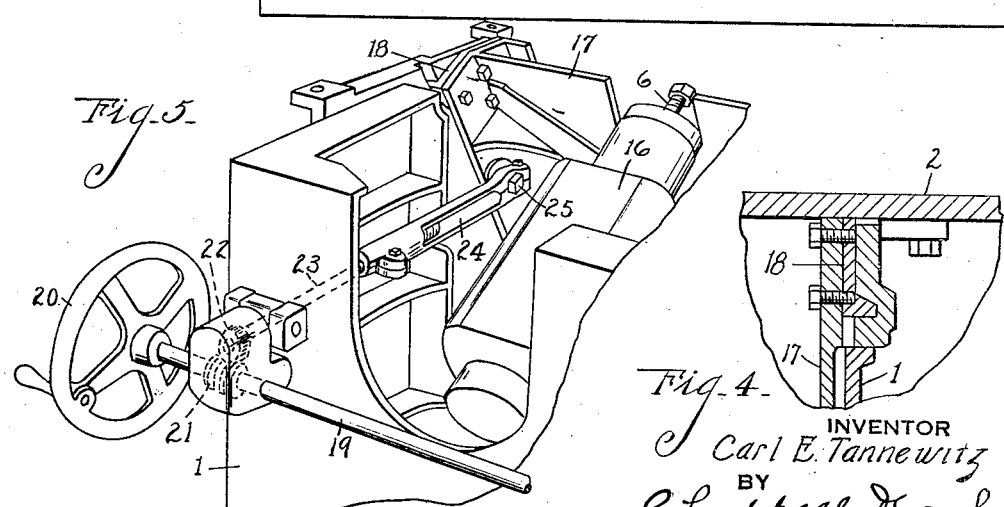
INVENTOR
Carl E. Tannewitz
BY
Chappell Earl
ATTORNEYS Patented June 23, 1931

1,811,066

UNITED STATES PATENT OFFICE

CARL E. TANNEWITZ, OF GRAND RAPIDS, MICHIGAN

SAWING MACHINE

Application filed February 23, 1929. Serial No. 341,929.

The main object of this invention is to provide in a sawing machine or saw table, as they are commonly called, a means for effectively braking or stopping the saw which is capable of convenient and easy manipulation.

A further object is to provide a structure having these advantages which does not subject the saw to any undue stresses.

Objects pertaining to details and economies of my invention will definitely appear from the description to follow. The invention is defined in the claims.

A structure which embodies the features of my invention is clearly illustrated in the accompanying drawings in which:

Fig. 3 is a fragmentary view partially in vertical section illustrating the relation of the operating parts to the table and the mounting for the saw frame.

Fig. 4 is a fragmentary section taken on line 4—4 of Fig. 3.

Fig. 5 is a fragmentary perspective view with the table removed, the saw frame being shown in a tilted position, as distinguished from the upright position in Fig. 3.

Figure 1:
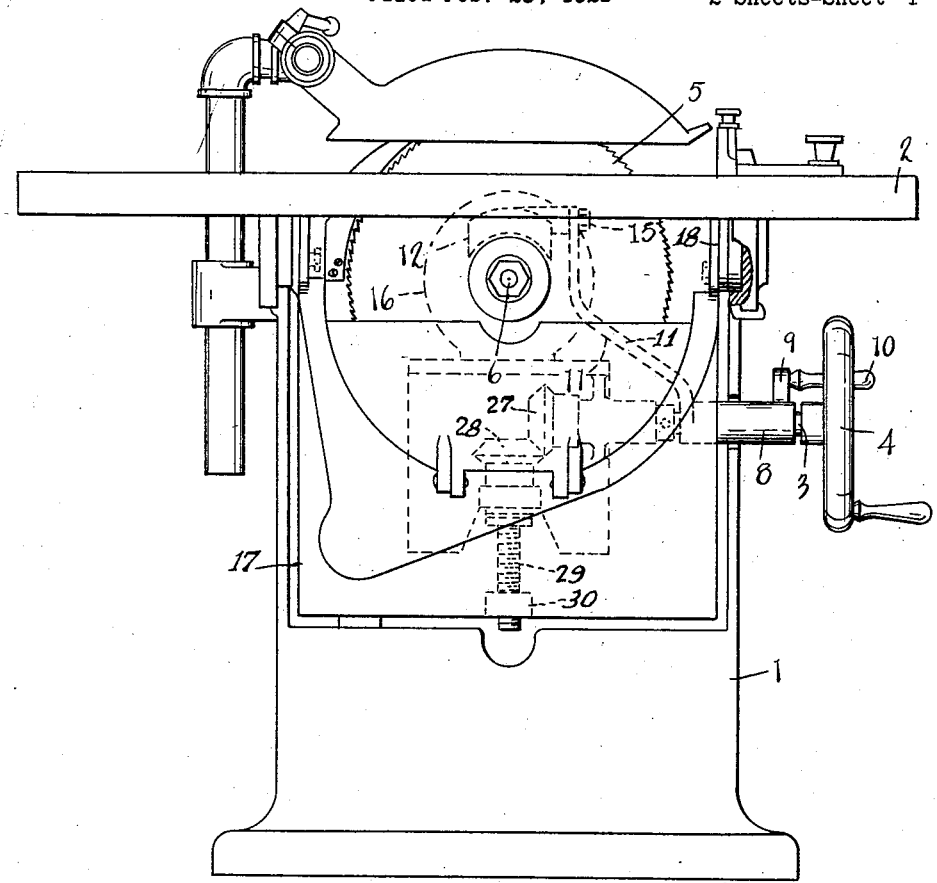
Fig. 1 is a side elevation of a sawing machine embodying my improvements, only such portions of the machine being illustrated as are deemed necessary to the proper illustration of my present improvements.
Figure 2:
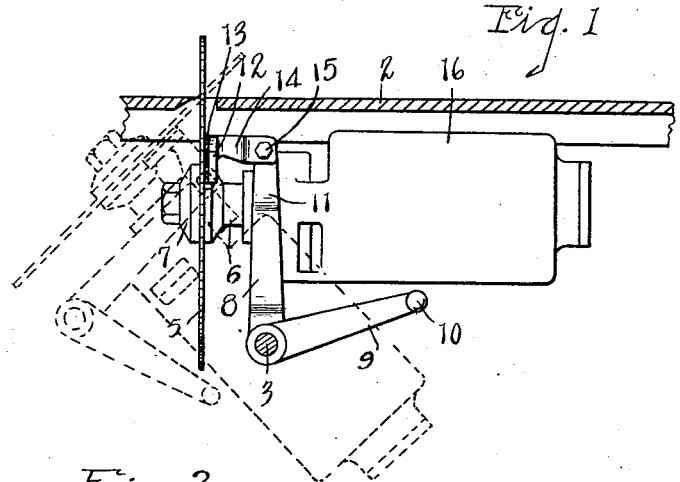
Fig. 2 is a fragmentary view partially in vertical section.

In the embodiment illustrated, 1 represents the pedestal and 2 the table. The saw frame, designated generally by the numeral 17, is provided with segmental journals or bearing engaging members 18 coacting with segmental slot-like bearings on the sides of the pedestal, so that the saw frame is rockingly or tiltably supported in these bearings. This tilting of the saw frame is accomplished through a shaft 19 having a hand wheel 20 at one end thereof, this shaft having a worm 21 coacting with a gear 22 on the spindle 23, which has threaded engagement with the link 24 pivoted to the saw frame at 25.

The motor, designated generally by the numeral 16, is mounted on a slide 26 carried by the frame for adjustment therein. The saw 5 is mounted on the arbor 6 and secured thereon by means of the clamping collars 7. The slide 26 is vertically adjusted by means of the shaft 3 which has the hand wheel 4 thereon, the shaft 3 being provided with a pinion 27 meshing with a gear 28 on the screw 29 which is rotatably engaged with the slide and has threaded engagement with a lug 30 on the saw frame.

On the shaft 3 I mount a bell crank lever 8, one arm 9 of which is provided with a handpiece 10 disposed at the side of the handwheel 4 so that it may be conveniently operated by an operator in position to operate the hand wheel 4.

The arm 11 of the lever 8 projects upwardly at the side of the saw and carries a brake shoe 12 provided with a friction facing 13. This brake shoe is preferably segmental in form and is carried by an arm 14 detachably secured to the arm 11 of the lever by means of the bolt 15. The brake shoe is thus supported to engage the side of the saw adjacent the periphery of the arbor collar on that side of the saw.

My improved brake means effectively stops the saw without material vibration or heating, and the braking mechanism may be applied to saws of types now very extensively used.

I have illustrated and described my improvements in an embodiment which I have found very practical. I have not attempted to illustrate or describe other embodiments or adaptations as it is believed that this disclosure will enable those skilled in the art to embody or adapt my improvements as may be desired.

Having thus described my invention what I claim as new and desire to secure by Letters Patent is:

1. The combination in a sawing machine comprising a table, a saw and adjusting means, including a shaft, of a circular saw operatively associated with said table and provided with a support pivotally mounted on said table, said saw being provided with an arbor having saw clamping collars, a bell crank brake supporting and actuating lever pivotally mounted on said shaft and provided with a hand piece on one arm, and a brake shoe mounted on the other arm of said lever whereby the brake shoes is supported for engagement with a side of the saw adjacent the periphery of one of its said saw clamping collars.

2. The combination in a sawing machine comprising a table, and a saw adjusting means, including a shaft, of a circular saw operatively associated with said table and provided with a support pivotally mounted on said table, a bell crank brake supporting and actuating lever pivotally mounted on said shaft and provided with a hand piece on one arm, and a brake shoe mounted on the other arm of said lever whereby the brake shoe is supported for engagement with a side of the saw.

3. The combination in a sawing machine, of a circular saw provided with a pivoted support and with an arbor having saw clamping collars, a bell crank brake supporting and actuating lever pivotally mounted on an axis traveling about the axis of the saw support, and a brake shoe mounted on one arm of said lever for engagement with the side of the saw adjacent the periphery of one of its said saw clamping collars, the other arm of the lever being provided with a handle.

4. The combination in a sawing machine, of a circular saw provided with a pivoted support and with an arbor having saw clamping collars, a bell crank brake supporting and actuating lever mounted to swing in an arc centering in the saw support, and a brake shoe mounted on one arm of said lever for engagement with the side of the saw adjacent the periphery of one of said saw clamping collars, the other arm of the lever being provided with a handle.

5. The combination in a sawing machine, of a circular saw provided with a pivoted support, a bell crank brake supporting and actuating lever mounted to swing in an arc centering in the saw support, and a brake shoe mounted on one arm of said lever for engagement with the side of the saw, the other arm of the lever being provided with a handle.

6. The combination in a sawing machine, of a circular saw provided with a pivoted support whereby the same is supported for tilting adjustment, a brake shoe actuating lever having a pivot swinging in an arc centering in the pivot of the saw support, and a brake shoe mounted on said lever to engage the side of the saw.

In witness whereof I have hereunto set my hand.

CARL E. TANNEWITZ.